United States Patent [19]
Irvine et al.

[11] Patent Number: 5,126,050
[45] Date of Patent: Jun. 30, 1992

[54] GRANULAR ACTIVATED CARBON-SEQUENCING BATCH BIOFILM REACTOR (GAC-SBBR)

[75] Inventors: Robert L. Irvine, Granger; Lloyd H. Ketchum, Jr., South Bend, both of Ind.; Peter A. Wilderer, Hamburg, Fed. Rep. of Germany; Carlo D. Montemagno, Minooka, Ill.

[73] Assignee: SBR Technologies, Inc., Granger, Ind.

[21] Appl. No.: 526,068

[22] Filed: May 10, 1990

[51] Int. Cl.$^5$ .............................. C02F 1/28; C02F 3/06
[52] U.S. Cl. ................................. 210/615; 210/621; 210/631; 210/663; 210/673; 210/694; 210/151; 210/202; 210/259; 210/266
[58] Field of Search ............... 210/615, 620, 621, 631, 210/663, 670, 673, 694, 150, 151, 202, 220, 258, 259, 266, 269

[56] References Cited

U.S. PATENT DOCUMENTS

| | | | |
|---|---|---|---|
| 1,866,417 | 7/1931 | Mackert | 210/673 |
| 3,927,175 | 12/1975 | Garofano et al. | 210/694 |
| 4,415,456 | 11/1983 | Chandler, Jr. | 210/694 |
| 4,416,993 | 12/1983 | McKeown | 210/615 |
| 4,623,464 | 11/1986 | Ying et al. | 210/631 |
| 4,663,047 | 5/1987 | Krauthausen et al. | 210/631 |
| 4,746,435 | 5/1988 | Onishi et al. | 210/615 |
| 4,755,296 | 7/1988 | Ying et al. | 210/631 |
| 4,775,475 | 10/1988 | Johnson | 210/694 |
| 4,857,198 | 8/1989 | Meidl | 210/631 |

Primary Examiner—Stanley S. Silverman
Assistant Examiner—Christopher Upton
Attorney, Agent, or Firm—Thomas J. Dodd

[57] ABSTRACT

A periodic multistage process which minimizes fugitive pollutant emissions has been developed for the removal and destruction of volatile, semi-volatile, and non-volatile organic contaminants from either water, wastewater, or spent granular activated carbon. This invention relates to methods, materials, and systems for treating these contaminants by a process and devices which uniquely combine granular activated carbon adsorption and desorption with biological treatment. The process and devices extend existing treatment systems by: (1) providing biofilm growth in a Sequencing Batch Biofilm Reactor on gas permeable membrane which uses oxygen for the supply of the electron acceptor and other organics (e.g., methane), as needed, for the supply of alternative electron donors, (2) limiting the flow of gases to that which is needed to meet the demand of the microorganisms only and, thus, minimize the escape of volatile organic contaminants in the carrier gases, (3) bioregenerating granular activated carbon while minimizing the attachment of biomass to the granular activated carbon, and (4) periodically operating the Granular Activated Carbon-Sequencing Batch Biofilm Reactor system to remove and destroy the organic contaminants present in either water, wastewater, or spent granular activated carbon. The system also optimizes the use of nutrient additives and minimizes the production of unwanted waste byproducts while ensuring that all treated waters, regardless of their original level of contamination, meet the highly stringent clean-up levels established by governing regulatory agencies, and producing granular activated carbon that is regenerated.

12 Claims, 5 Drawing Sheets

Granular Activated Carbon - Sequencing Batch Biofilm Reactor

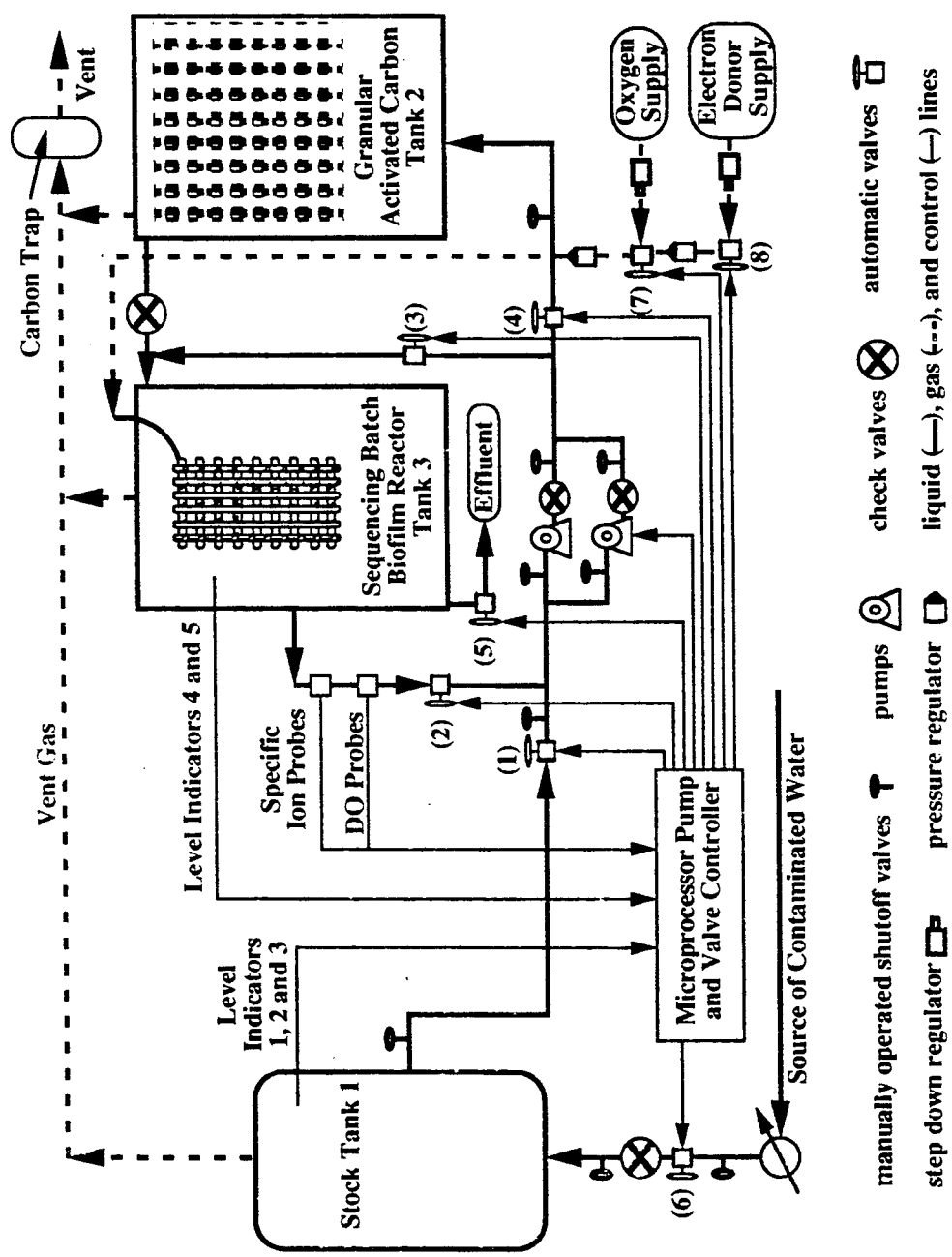
Figure 1. Granular Activated Carbon - Sequencing Batch Biofilm Reactor

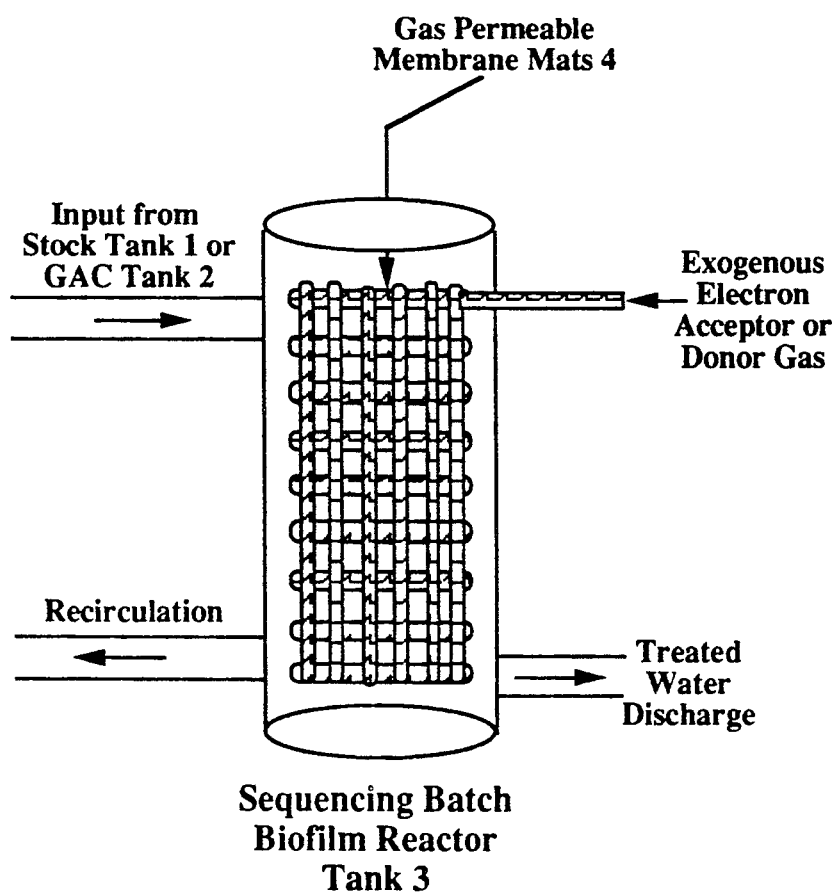
Figure 2. Sequencing Batch Biofilm Reactor

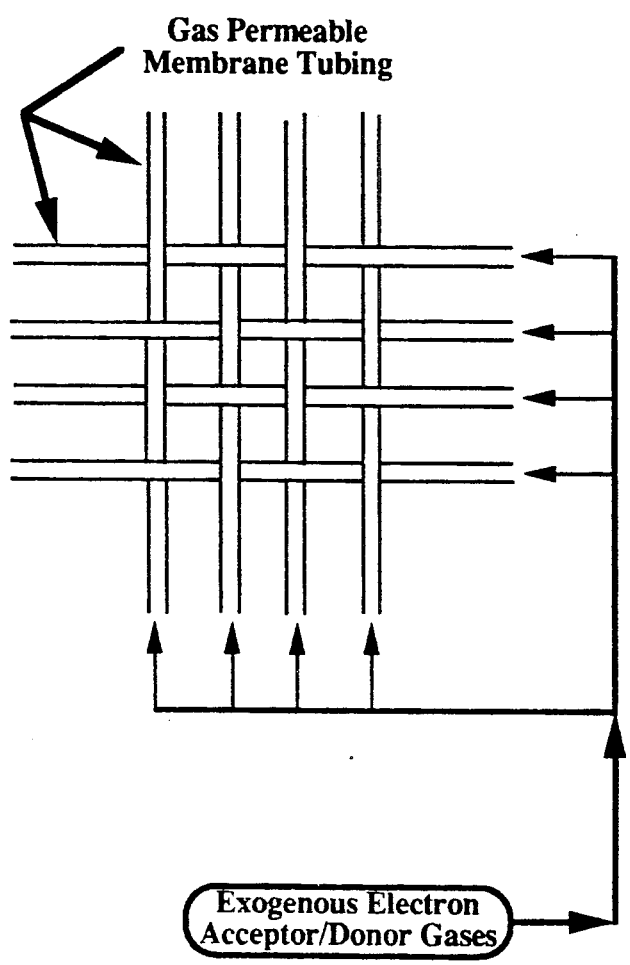
Figure 3. Gas Transfer System for the Gas Permeable Membrane

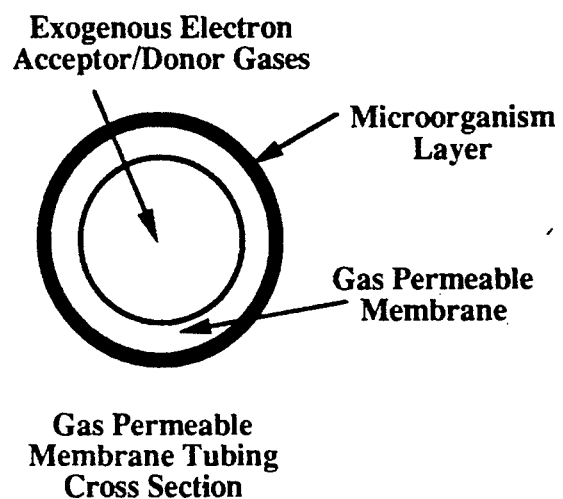
Figure 4. Gas Permeable Membrane Details

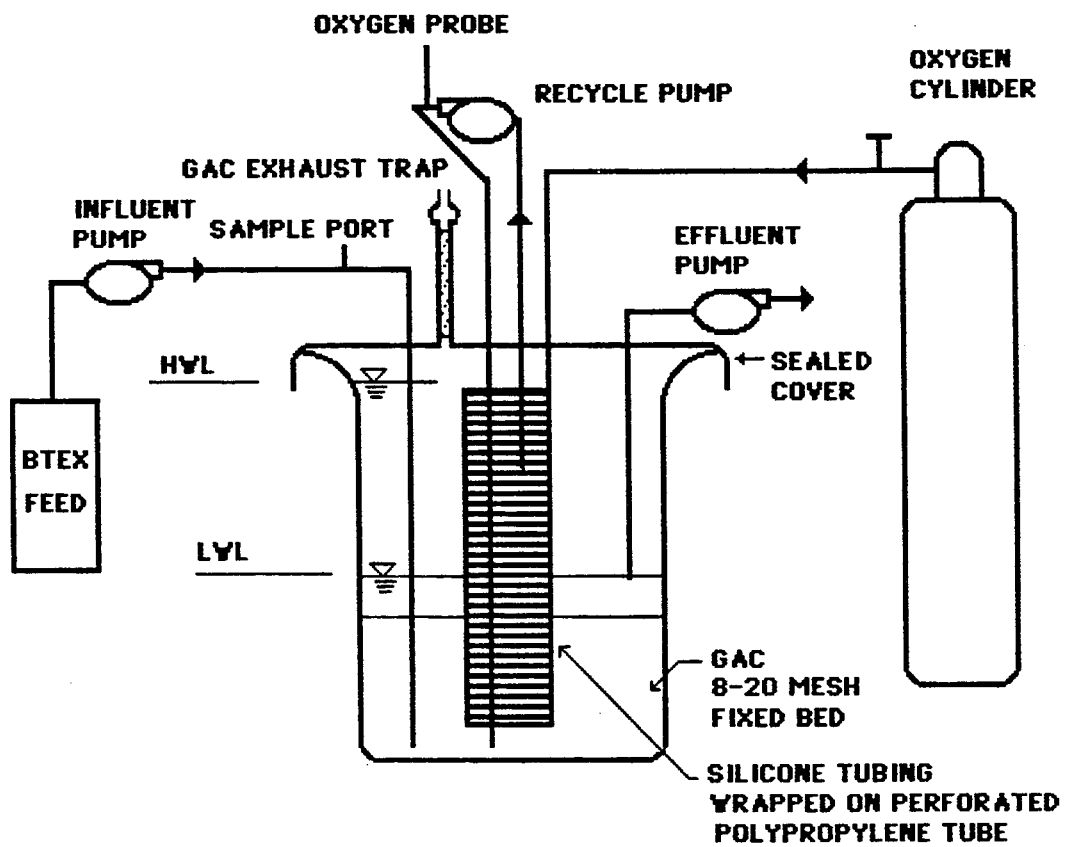
Figure 5. Laboratory Reactor System

GRANULAR ACTIVATED CARBON-SEQUENCING BATCH BIOFILM REACTOR (GAC-SBBR)

BACKGROUND OF INVENTION

There is no question that this country's total waste dilemma will continue well into the twenty-first century. Fundamental advances, new discoveries, and technological developments in pollution control have not kept pace with our nation's needs for environmental management. The United States produces roughly 700,000 tons of hazardous waste each day, has identified more than 25,000 potentially dangerous hazardous waste sites across the nation, and has roughly 1,000,000 additional sites that have resulted from leaking underground storage tanks including those used for gasoline storage at local gas and service stations. When coupled with the particularly onerous wastes that are injected to hundreds of deep wells, the tens of thousands of municipal landfills, and the innumerable liquid and gaseous discharges from existing municipal and industrial facilities, the total accumulated environmental debt for the nation easily matches the current federal deficit of more than $2 trillion.

That this environmental debt is not being met is apparent. An annual payout for pollution control of only $90 billion has provided active cleanup of less than 200 sites and complete cleanup of less than 10% of the highest-priority 1200 sites. Public outcry following such disasters as Love Canal, Bhopal, Monongahela, and Valdez focuses attention on the consequences of overlooking pollution control issues. The public is demanding more aggressive cleanup programs and stricter disposal regulations. Yet neither the problem nor the solution belongs solely to the government. In the United States, for example, industry has tended to view pollution control as a cost, an inconvenience that must be resolved, rather than an area worthy of intensive research. The total new plant and equipment expenditures planned for 1988 for this country's non-farm business (i.e., durable and nondurable goods, mining, transportation, utilities, trade and services, and communication) was $477 billion. Only $9 billion of this total, nearly 2%, was planned for pollution abatement. (The percentage of total expenditures for a particular industry can, of course, be significantly greater, or smaller, than the industrial average.) Marginal industries cannot afford these costs; they cannot afford to pay for the environmental debt that they have accumulated.

One result of even reluctant investment in pollution control research and facilities is a reduced ability of U.S. industry to compete in the international marketplace. A contributing factor, of course, is that countries with either no or notably less stringent pollution control regulations (note: Japan has not yet begun to address the hazardous waste issue), provide their industries with a competitive edge over this country's industries, with obvious damaging impact on those that are marginal. And while direct expenditures by U.S. industry for pollution control (e.g., health and environmental management, testing and monitoring, recycle/recovery, and site remediation), was expected to be roughly $10 billion in 1989, the corresponding costs in Western Europe and Japan were about $6.4 billion and $3.6 billion. respectively. Developing nations have little impact on cost estimates at this time, however the pollution control industry can look to these countries as an almost limitless future market. New technologies must be developed which will allow U.S. industry to complete more effectively in the international marketplace and reduce the cost of the environmental debt that has been accumulated by both government and industry.

BRIEF DESCRIPTION OF THE INVENTION

This invention, a periodic multistage process which minimizes fugitive pollutant emissions, has been developed for the removal and destruction of volatile, semi-volatile, and non-volatile organic contaminants from either water, wastewater, or spent granular activated carbon (GAC). Specifically, this invention relates to methods, materials, and systems for treating organic contaminants present in water, chemical process wastewaters, gaseous emissions from industrial processes, landfill leachates, and leaking underground storage tanks, by a process which uniquely combines granular activated carbon adsorption with biological treatment.

In addition, this invention relates to improving the ability of periodic fixed film biological systems to destroy organic contaminants by using a process which involves the following:

1. Analyzing the organic contaminants to determine the composition of the contaminants to be removed.
2. Preparing a culture of microorganisms specifically selected for their ability to degrade organics present in the water, wastewater, or spent GAC.
3. Inoculating the system with the microbial culture prepared in Step 2 for the formation of a biofilm (i.e., attached growth) on the exterior walls of a gas permeable membrane.
4. Supplying of an electron acceptor (oxygen) and, when needed, a supplemental electron donor (e.g., methane gas) through, for example, the lumen of a semipermeable silicone rubber membrane tubing to allow the selective attachment and growth of the microbial culture prepared in Step 2 to the exterior walls of the silicone tubing as a biofilm.
5. Developing a dense, adhesive biofilm on the surface of the gas permeable membrane in Step 4 by providing high liquid flow past the biofilm.
6. Adding GAC to the system for the purpose of adsorbing organics present in water, chemical process wastewaters, landfill leachates, and/or water contaminated by leaking underground storage tanks, or adding spent GAC which was obtained from treatment processes used to adsorb organic contaminants present in water, chemical process wastewaters, gaseous emissions from industrial processes, landfill leachates, and/or water contaminated by leaking underground storage tanks.
7. Desorbing the organics adsorbed on the GAC added to the system in Step 6.
8. Employing the organism system obtained in Step 4 to biodegrade the organics that are desorbed from the GAC added to the system in Step 6 and/or present in water, chemical process wastewaters, landfill leachates, and/or water contaminated by leaking underground storage tanks.
9. Periodically filling and drawing the system when treating contaminated water or wastewater and simply recirculating waters from a bulk storage tank when the system is used solely to bioregenerate spent GAC.
10. Disposing of the waste effluent and waste biomass produced.

Because the flow of gases through the gas permeable membrane is limited to that which is needed the demand of the microorganisms, there is little or no gas flow through the reactor and, thus, little or no loss of organics to the environment by either volatilization or stripping. In addition, the Granular Activated Carbon-Sequencing Batch Biofilm Reactor offers several other advantages: (1) microorganisms attached to biofilms are better suited for the treatment of waters or wastewaters with low concentrations of organic compounds than those that are present in suspended growth activated sludge processes including conventional Sequencing Batch Reactors (SBRs); (2) large numbers of slow-growing organisms can be maintained in the Granular Activated Carbon-Sequencing Batch Biofilm Reactor system, even under high hydraulic loading rates; (3) organisms that are capable of degrading key organics but have either low yield or poor settling characteristics would be washed out of suspended growth reactors and maintained in the Sequencing Batch Biofilm Reactor; (4) peak loadings or flow variations can be handled without disruption of performance because of the redundancy provided by both the GAC and the elevated oxygen uptake rates that can be met by the oxygen supplied by the gas permeable membrane; and (5) effluent requirements can be met for short periods using the granular activated carbon adsorption system (e.g., for one week or more depending upon the quantity and type of GAC used) if failure of the biological treatment portion of the system occurs.

THE PRIOR ART

Biological systems that are related to the invention described in this application and which are being used or developed for the treatment of organic contaminants present in water, chemical process wastewaters, landfill leachates, leaking underground storage tanks, and spent activated carbon are as follows:

1. conventional suspended growth Sequencing Batch Reactors (SBRs),
2. convention suspended growth SBRs used to pretreat hazardous wastes prior to final polishing by GAC,
3. continuous flow or batch activated sludge systems that have powdered activated carbon (PAC) added directly to the biological reactor,
4. conventional suspended growth SBRs that use semipermeable silicone rubber membrane tubing to meet high oxygen uptake rates,
5. biofilms attached to spent GAC that are supplied oxygen thru semipermeable silicone rubber membrane tubing, and
6. biofilms attached to semipermeable silicone rubber membrane tubing.

Except for the powdered activated carbon system listed as Item 3, the coinventors of this application have been involved in the development and implementation of all of the above technologies. Each of these technologies is discussed below.

Conventional suspended growth SBRs are currently being used extensively for the treatment of both domestic and industrial wastewaters. A typical system consists of a single aeration tank or several aeration tanks operated in parallel with a fixed cycle time consisting of five stages: fill, react, settle, draw, and idle. Typical SBR applications involve the use of a suspended culture where mixing and/or aeration are used to keep the microorganisms in suspension. During settle, draw, and idle, mixing and aeration are turned off to allow the microorganisms to settle, thus allowing clear supernatant to be removed from the reactor while maintaining an active culture within the reactor. A complete summary of conventional Sequencing Batch Reactors is described by Robert L. Irvine and Lloyd H. Ketchum, Jr., two of the coinventors of this application and the creators of the conventional suspended growth SBR, in an article titled "Sequencing Batch Reactors for Biological Wastewater Treatment," which appeared in 1989 in the *CRC Critical Reviews in Environmental Control*, Vol. 18, starting on page 255 and continuing thru page 294. The SBR system has been found to be effective in the treatment of a wide variety of organic contaminants present in waters and wastewaters but is not able to treat effectively waters and wastewaters that have low concentrations of organic contaminants, does not fully control either volatilization or stripping of volatile organics present in waters and wastewaters that have high concentrations of organic contaminants, and is not used to bioregenerate spent GAC. Our invention, the Granular Activated Carbon-Sequencing Batch Biofilm Reactor, significantly modifies conventional suspended growth Sequencing Batch Reactor technology as will be described in more detail later.

Conventional suspended growth SBRs have also been used to pretreat hazardous wastes prior to final polishing by GAC. Two such systems were described in a view article by Robert L. Irvine and Peter A. Wilderer, another of the coinventors of this application. The paper, "Aerobic Processes," edited by Harry M. Freeman and published by McGraw-Hill Book Company, appeared in pages 9.3 thru 9.18 of the *Standard Handbook of Hazardous Waste Treatment and Disposal* (1988). Initial studies for the two systems, a bench scale treatment of Occidental Chemical Company's Hyde Park leachate and the full scale treatment of CECOS International's wastewaters at their hazardous waste disposal site in Niagara Falls, were carried out under the direction of Robert L. Irvine. Both studies demonstrated that biological treatment in a suspended growth conventional SBR would markedly reduce the load of organics to the GAC. Additional information on these systems may be found in the following publications: (1) "Enhanced Biological Treatment of Leachates from Industrial Landfills," by Robert L. Irvine, Stanley A. Sojka, and Joseph F. Colaruotolo, in *Hazardous Waste*, Vol. 1, pp. 123 thru 135 (1984); (2) "Biological Treatment of a Landfill Leachate in Sequencing Batch Reactor," by Wei-chi Ying, Robert R. Bonk, Vernon J. Lloyd, and Stanley A. Sojka, in *Environmental Progress*, vol 5, pp. 41 thru 50 (1986); and (3) "Biological Treatment of Hazardous Waste in Sequencing Batch Reactors," by Philip A. Herzbrun, Robert L. Irvine, and Kenneth C. Malinowski, in *Journal Water Pollution Control Federation*, Vol. 57, pp. 1163 thru 1167 (1985). Unlike the Granular Activated Carbon-Sequencing Batch Biofilm Reactor described in this application, the conventional suspended growth SBR used in these studies works independently of the GAC reactors and is in no way involved with the bioregeneration of spent GAC.

Powdered activated carbon has also been added directly to suspended growth biological reactors that are operated in either the continuous flow or batch mode. These systems combine physical adsorption and biological treatment in the same reactor and have been used to treat waste streams with a wide variety of organic contaminants. Because the PAC is added to the biological reactor, the mass of microorganisms that can be used in the system is limited. In addition, significant quantities of spent PAC removed from the reactor on a regular basis must be regenerated and replaced. Examples of this system can be seen in: M. J. Dietrich, M. W. Copa, A. K. Chowdhury, and T. L. Randall, "Removal of Pollutants from Dilute Wastewater by the PACT TM Treatment Process," in *Environmental Progress*, Vol. 7, pp. 143 thru 149 (1988); and Wei-chi Ying, Robert R. Bonk, and Stanley A. Sojka, "Treatment of a Landfill Leachate in Powdered Activated Carbon Enhanced Sequencing Batch Bioreactors," in *Environmental Progress*, Vol. 6, pps. 1 thru 8 (1987). This technique for treating organic contaminants is expensive, inefficient, and leaves room for improvement because the waste biological solids and the spent PAC are commingled and the PAC is not regenerated by the process.

Some variations to the conventional suspended growth SBRs have been examined, including oxygenation of these suspended growth reactors through gas permeable membranes. A recent development for the use of semipermeable silicone rubber membrane tubing in SBRs to meet high oxygen uptake rates is reported by Peter A. Wilderer, J. Brautigam, and I. Sekoulov, in a paper titled "Application of Gas Permeable Membranes for Auxiliary Oxygenation of Sequencing Batch Reactors," in *Conservation and Recycling*, Vol. 8, pp. 181-192 (1985). Peter A Wilderer and R. G. Smith also described the use of silicone membranes in conventional suspended growth SBRs for the treatment of hazardous wastes in May 1986 during a presentation at the 41st Purdue Industrial Waste conference in West Lafayette, Ind. The presentation, titled "Treatment of Hazardous Landfill Leachate Using Sequencing Batch Reactors with Silicone Membrane Oxygenation," is published in the conference *Proceedings*, pp. 272-282 (1987). The studies described in these papers did not investigate the volatilization or stripping of organics present at high concentrations; they considered the growth of biomass on the surface of the silicone rubber membrane tubing as a nuisance (i.e. biofouling) which would minimize the transfer of oxygen to the organisms growing either in suspension or on other support medium; and they did not involve the use of any type of activated carbon. The GAC-SBBR minimizes fugitive emissions, maximizes biofilm growth on gas permeable membranes, and utilizes GAC.

Because of both the high cost associated with the thermal regeneration of spent GAC and the observation that bacteria colonizing GAC extended the time between GAC replacements, there has been considerable interest in the development of bioregeneration techniques for GAC. Examples of some of the early work in this area can be found in: (1) A. Benedek, "Simultaneous Biodegradation and Activated Carbon Adsorption—A Mechanistic Look," in *Activated Carbon Adsorption of Organics From the Aqueous Phase*, Vol. II, pp. 273-302, edited by M. J. McGuire and I. H. Suffet, published by Ann Arbor Science Publishers, Inc., Ann Arbor, Mich. (1980); (2) A. Benedek and A. Najak. "The Biological Regeneration of Activated Carbon," in a paper presented at 48th Annual Water Pollution Control Federation Conference, Miami Beach, Fla. (1975); (3) W. A. Chudyk and V. L. Snoeyink, "Bioregeneration of Activated Carbon Saturated With Phenol", in a paper presented at the AIChE Annual Meeting, New Orleans, La. (November, 1981); and (4) in a book edited by R. Rice and M. Robson, titled *Biological Activated Carbon, Enhanced Aerobic Biological Activity In GAC Systems*, published by Ann Arbor Science Publishers, Inc., Ann Arbor, Mich. (1982). In order to accelerate the growth of microorganisms on the surface of the GAC, Peter A. Wilderer and coworkers recently investigated using semipermeable silicone rubber tubing membranes to supply oxygen to biofilms attached to spent GAC. They found that spent GAC saturated with 3-chlorobenzoate was entirely regenerated after 67 days. A description of this study was provided by Von Mustafa Ali Jaar, Harald Krebs, Miguel A. Rubio, and Peter A. Wilderer, "Biologische Regeneration einer mit 3-Chlorbenzoat Beladenen Activkohle," in *Journal of Wastewater Research (Z. Wasser- Abwasser Forsch)*, Vol. 22, pp. 1-4 (1989). Unfortunately, because of the organism growth directly on the GAC, these systems can become clogged with biomass slime and have limited utility after regeneration. This difficulty is avoided in the Granular Activated Carbon-Sequencing Batch Biofilm Reactor described in this application.

The initial work with semipermeable silicone rubber membrane tubing was directed at the supply of oxygen and not at the attachment of biofilms on the membrane surface. The reason for this was that the desired high oxygen transfer rates required that pure oxygen rather than air be used as the source of oxygen. Until recently, investigators believed that biomass attachment on silicone tubing was not possible when pure oxygen was used because oxygen is toxic when present at high concentrations. The first investigators to report on the use of silicone rubber tubing for organism attachment were Eberhard Bock, Peter A. Wilderer, and Annette Freitag in an article titled "Growth of Nitrobacter in the absence of Dissolved Oxygen," in *Water Research*, Vol. 22, pp. 245-250 (1988). In this study air was passed through the silicone rubber tubing in such a way that the Nitrobacter attached to the tubing and the concentration of dissolved oxygen in the bulk liquid was essentially zero. While this study was focused on a basic research question and does not have direct application to the treatment issues addressed in this application, it did demonstrate the potential value of biofilm attachment on silicone tubing or any other gas permeable membrane.

When air or oxygen flows continuously through the lumen of the silicone tubing, volatile organics which dissolve readily in the silicone rubber escape into the gas phase. Miguel A. Rubio, Harold Krebs, Peter A. Wilderer, and Oliver Debus addressed this problem in a poster presentation titled "Aerobic Degradation Of Benzene, Toluene, and the Isomeric Xylenes by Microorganisms Immobilized on Gas Permeable Membranes," at the *Forum on Innovative Hazardous Waste Treatment Technologies: Domestic and International*, in Atlanta, Ga., Jun. 19-21, 1989. They reported that the loss of such volatile organics can be minimized by microorganisms which attach to the silicone tubing by forming to biofilm "barrier" to the escaping volatile organics. Results from a similar study were presented by Peter A. Wilderer at conference on the *Physiology of Immobilized Cells* in Wageningen, The Netherlands, Dec. 10-13, 1989. The title of Peter A Wilderer's presentation was "Immobilization of Cells at Gas Permeable Membranes." In the invention described in this application, we have extended these studies by: (1) providing biofilm growth on gas permeable membranes by using oxygen for the supply of the electron acceptor and other organics (e.g., methane), as needed, for the supply of alternative electron donors, (2) limiting the flow of gases through the gas permeable membrane to that which is needed to meet the demand of the microorganisms only and, thus, minimize the escape of volatile organics in the carrier gases, (3) bioregenerating GAC while minimizing the attachment of biomass to the GAC, and (4) periodically operating the Granular Activated Carbon-Sequencing Batch Biofilm Reactor to remove and destroy volatile, semi-volatile, and non-volatile organic contaminants present in either water, wastewater, or spent GAC.

BRIEF DESCRIPTION OF THE DRAWINGS

FIG. 1 is a schematic of the complete Granular Activated Carbon-Sequencing Batch Biofilm Reactor system.

FIG. 2 is a drawing illustrating the major elements incorporated into the Sequencing Batch Biofilm Reactor vessel.

FIG. 3 is a detailed sketch of a representative section of the gas permeable membrane mat gas transfer system utilized in the Sequencing Batch Biofilm Reactor.

FIG. 4 is a detailed cross-sectional view of the gas permeable membrane showing the locations of the micro-organism layer in the exogenous electron acceptor or donor gases.

FIG. 5 is a schematic of the laboratory reactor granular activated carbon-sequencing batch biofilm reactor used in the example.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be construed as limiting, but merely as a basis for the claims and as a representative basis for teaching one skilled in the art to employ the present invention in virtually any appropriately detailed structure.

This multistage process may be used to treat liquid streams or spent granular activated carbon. The contaminants can originate directly from lightly contaminated groundwater, heavily contaminated groundwater (i.e., leachates), landfills, contaminated soils, leaking underground storage tanks, spills and other contaminated dumps, surface water, an industrial or commercial process, spent granular activated carbon, or any other water or wastewater treatment system. The contaminants consist principally of volatile, semi-volatile, and non-volatile organic compounds. Characteristically, the concentration of contaminants in the source water will vary markedly with time. The principal concerns in detoxifying the polluted water or spent granular activated carbon include: (1) the elimination of fugitive contaminant emissions into the atmosphere, (2) ensuring that all the treated waters regardless of their original level of contamination meet the highly stringent clean-up levels established by the governing regulatory agency, and (3) producing granular activated carbon that is regenerated. The subject invention meets these requirements in both an unique and highly efficacious manner.

The mode of operation for the Granular Activated Carbon-Sequencing Batch Biofilm Reactor depends upon what is to be treated. Three cases are described for this invention.

Case 1. In order to ensure that the microorganisms are not exposed to lethal concentrations of the contaminants, the following steps are followed when the system is used to treat water or wastewater that has contaminants present at high concentrations:
1. collecting and otherwise pretreating the waters in a bulk storage tank,
2. adsorbing the biodegradable and nonbiodegradable hazardous and polluting compounds on a granular activated carbon filter,
3. desorbing the biodegradable pollutants off the granular activated carbon creating a waste stream with a relatively uniform concentration of diodegradable contaminants and providing a feed stock for the microorganisms growing as a biofilm on the gas permeable membrane in the Sequencing Batch Biofilm Reactor.
4. destroying the waste stream biodegradable contaminants in a Sequencing Batch Biofilm Reactor using specialized microbes.

Case 2. When the system is used to treat water or wastewater that has contaminants present at low concentrations, the order of the steps described above is modified as is shown below to ensure that there is sufficient substrate (food) for the microorganism to grow:
1. collecting and otherwise pretreating the waters in a bulk storage tank,
2. destroying the biodegradable waste stream contaminants in a Sequencing Batch Biofilm Reactor using specialized microbes,
3. adsorbing residual biodegradable and nonbiodegradable hazardous and polluting compounds on a granular activated carbon filter, and
4. desorbing the biodegradable pollutants off the granular activated carbon creating a waste stream with a relatively uniform concentration of contaminants which are destroyed by the microbes on the biofilm.

Case 3. When the system is used to bioregenerate spent granular activated carbon, the simple recirculation mode of operation described below is followed:
1. the suppling of recirculation waters from a bulk storage tank,
2. desorbing the biodegradable pollutants off the spent granular activated carbon, and
3. destroying the desorbed biodegradable contaminants in a Sequencing Batch Biofilm Reactor using specialized microbes.

In all three cases, the periodic stressing of the microbial consortia and the delivery of the necessary exogenous electron acceptor and donors via the gas permeable membrane in the Sequencing Batch Biofilm Reactor eliminate unwanted transfer of the pollutants from the liquid to the vapor phase, enrich for microorganisms that are capable of destroying contaminants that may have been previously been characterized as nonbiodegradable, and destroy the biodegradable contaminants in a cost effective manner. The use of the granular activated carbon filter to stabilize and concentrate the incoming waste stream allows the biological treatment of contaminated waters in situations where the pollutant concentration is either highly variable and/or normally insufficient to support a viable and efficacious microorganism population.

FIG. 1 is schematically representative of the Granular Activated Carbon-Sequencing Batch Biofilm Reactor treatment system.

A detailed description of the operating characteristics of the Granular Activated Carbon-Sequencing Batch Biofilm Reactor is provided below for each of the major system components shown in FIG. 1. The indicating and controlling devices are described first. This is followed by a description of the equipment.

INDICATING DEVICES

Stock Tank 1 Liquid Level Indicators

LEVEL 1 Emergency High Water Level (HWL). To prevent emergency overflow. Provides alarm and shut down of influent pump system or Valve 6 (if wet).

LEVEL 2 Normal HWL. For normal shut down of influent pump system or Valve 6 (if wet).

LEVEL 3 Low Water Level (LEL). To prevent Draw in Sequencing Batch Biofilm Reactor (SBBR) Tank 3 if there is insufficient volume in Stock Tank 1 to complete Fill (if dry).

SBBR Tank 3 Liquid Level Indicators

LEVEL 4 HWL for normal ending of Fill (if wet).
LEVEL 5 LWL for normal ending of Draw (if dry).

Specific Ion Probe

SBBR Tank 3 recycle outlet line. To indicate and record specific ions (e.g., a pH probe for hydrogen ions).

DO Probes

Two units in series in the SBBR Tank 3 recycle outlet line. To indicate Dissolved Oxygen (DO), record the average value if the difference is equal to or less than some specified low DO (e.g., 0.2 mg/L), and to control the oxygen supply Valve 7. If the difference is greater than the specified difference, an alarm is actuated and Valve 7 fails open.

CONTROLLING DEVICES

VALVE 1 To fill Granular Activated Carbon Tank 2 first either when used to bioregenerate spent granular activated carbon or when used to treat water or wastewater that has contaminants present at high concentrations and to fill SBBR Tank 3 first when used to treat water or wastewater that has contaminants present at low concentrations. Normally closed. Open if LEVEL 2 INDICATOR is wet and Fill is to begin. Closes when Fill ends as indicated by LEVEL 4 INDICATOR becoming wet.

VALVE 2 To provide recycle around SBBR Tank 3 only during the first part of React when used to treat water or wastewater that has contaminants present at low concentrations, and to provide recycle around both Granular Activated Carbon Tank 2 and SBBR Tank 3 when used to bioregenerate spent granular activated carbon, or during the latter part of React when used to treat water or wastewater that has contaminants present at low concentrations, or throughout React when used to treat water or wastewater that has contaminants present at high concentrations. Normally open. Closes at the beginning of Fill and opens when Fill ends.

VALVE 3 To provide SBBR Tank recycle when Granular Activated Carbon Tank 2 is not on line. Normally open when Valve 4 closed. Closed when Valve 4 open.

VALVE 4 To provide recycle around both Granular Activated Carbon Tank 2 and SBBR Tank 3 when Granular Activated Carbon Tank 2 is on line. Normally closed when Valve 3 open. Opens at appropriate time during React or when used to bioregenerate spent granular activated carbon. Closes after predetermined period of time and before Draw begins.

VALVE 5 To provide gravity Draw. Normally closed. Opens if LEVEL 2 INDICATOR is wet and after React has been completed. Closes after LEVEL 5 INDICATOR (i.e., dry) indicates that the SBBR Tank 3 is empty.

VALVE 6 To control flow into the Stock Tank 1. Normally open. Closes if LEVEL 2 INDICATOR (i.e., wet) shows the tank to be full or if LEVEL 1 INDICATOR (i.e., wet) shows alarm and LEVEL 2 INDICATOR failed to provide adequate control.

VALVE 7 To control the flow of oxygen and other gases to the gas permeable membranes in SBBR Tank 3. Normally open. Closes if the DO exceeds some specified limit (e.g., 1.0 mg/L) and opens if it is less than some other lower specified limit (e.g., 0.3 mg/L).

VALVE 8 To control the flow of other gases (i.e., electron donors) to the gas permeable membranes in SBBR Tank 3. Normally open during React and closed during other cycle periods.

Duplex Pumps Between Valves 1 and 3

Two pumps, with one manually selected as a lead pump. Fill to begin with Valve 1 open and lead pump on. Pumping continues throughout React with recycle valves changing as described above. The operating pump shuts off at the end of the required React time.

EQUIPMENT DESCRIPTION

Stock Tank 1

The source water will initially be pumped into Stock Tank 1. Stock Tank 1 is constructed with an integral vapor recovery system and incorporates access for the periodic removal of tank bottoms. Stock Tank 1 serves as: (1) a buffer to stabilize the feed rates into the treatment system for situations where the feed flow rate is highly variable (2) a catch basin to accumulate feed water during periods when maintenance is performed on the treatment system (3) a settling basin to remove suspended solids from the feed water, and (4) a mixing tank to provide an initial stabilization of the contaminant load levels. The Stock Tank 1 is sized to accommodate a minimum of one day's feed fluid flow. It is insulated, has three liquid level indicators, appropriate inlet and outlet connections, and provisions for nutrient supply. All other tanks overflow back to Stock Tank 1. Exhaust gas is diverted to the carbon trap.

Granular Activated Carbon Tank 2

It is insulated as desired and has the appropriate quantity (e.g., to provide adsorption capacity for one week or more) and type of granular activated carbon. The influent is provided at the bottom through a distributor to prevent fluidizing the granular activated carbon bed. The outlet is near the top. Exhaust gas is diverted to the carbon trap.

SBBR Tank 3

FIG. 2 schematically illustrates the internal workings of the Sequencing Batch Biofilm Reactor Tank 3. Feed liquor enters at the top of the reactor and passes over gas permeable membrane mats 4 where the contaminants are removed from the water and destroyed. The gas permeable membrane mats are illustrated in detail in FIG. 3. The mats serve two primary functions. First they supply the necessary exogenous electron acceptors and donors for supporting the appropriate microorganisms without volatizing the contaminants. Second, they provide a surface from which the growth of microorganisms can be controlled. As shown in FIG. 3 the exogenous electron acceptor, either air or oxygen for aerobic metabolism or an alternative electron donor (e.g., methane), is introduced thru the lumen of the tubing. The gas within the lumen of the tubing is normally kept at a positive pressure relative to the rest of the reactor vessel. The exogenous electron acceptor and/or donor gases diffuse from the lumen thru the wall of the tubing to the outer surface of tubing where a thin layer of microorganisms grow. These microorganisms immediately capture the exogenous electron acceptor and donor (if supplied) gas molecules and then, utilizing the liquor pollutants as a carbon source, mineralize the contaminants. Upon completing the mineralization of the contaminants a brief period of quiescence is employed to allow the settling of any suspended solids in the liquor. The treated water is then decanted from the Sequencing Batch Biofilm Reactor Tank 3 and either reused or disposed of appropriately. When used for the bioregeneration of spent granular activated carbon, regenerated granular activated carbon is returned to its source. The entire treatment process is then repeated. The Sequencing Batch Biofilm Reactor Tank 3 is insulated as desired, has two liquid level indicators, an overflow connection to Stock Tank 1, a recycle outlet, a recycle inlet, a withdrawal device, an exhaust gas connection to the carbon trap, and a removable top to examine and replace the gas permeable membrane system.

Gas Supply System

Near optimal conditions for microbial growth in the Sequencing Batch Biofilm Reactor Tank 3 are achieved by maintaining the concentration of DO in the liquor as close to zero as possible. Control of the diffusion rate across the gas permeable membrane is achieved by dynamic adjustment of the source exogenous electron acceptor and electron donor gas pressure. A step down regulator is followed by Valve 7 to prevent high DO in the bulk liquid, and an adjustable pressure regulator is used to hold the pressure in the gas permeable membrane within an appropriate range. A step down regulator and an adjustable pressure regulator are used in conjunction with Valve 8 to control the flow of the electron donor or donors. The material for the gas permeable membrane may be either silicone rubber or any other material that meets different system objectives.

Carbon Trap

In order to prevent the escape of volatile organics from all tanks, exhaust gases are collected and vented through a carbon trap.

Controller

A Microprocessor controller with appropriate number of inputs (e.g., 50) and outputs (e.g. 25), a system clock, and battery backup, is used to provide nearly complete automatic control.

Additional Valves and Piping

Manually operated shutoff valves, check valves, and piping for liquid gas, and electrical controls, are all insulated and are used as described in this section.

EXAMPLE OF THE INVENTION

The following example is given to further describe our invention. It is provided for illustrative purposes only and is not intended to limit the scope of our invention except as defined in the appended claims. This example summarizes the performance of a bench scale granular Activated Carbon-Sequencing Batch Biofilm Reactor which was used for the biodegradation of the volatile organics benzene, toluene, ethylbenzene, and xylenes (i.e BTEX). The material for the gas permeable membrane was silicone rubber. The study was conducted between Aug. 30 and Oct. 11, 1989.

PROCESS DESCRIPTION

The experimental system used is shown in FIG. 4. It was operated as a single tank GAC-SBBR in which wastewater organics were first adsorbed onto a fixed bed of GAC and subsequently degraded by specialized microorganisms inhibiting the system.

During the Fill and React periods, the organics remaining in the liquid phase were biologically converted to carbon dioxide, water, and biomass by the bacteria which grew as a biofilm on the surface of the silicone tubing. As more of the organics were degraded and removed from the bulk liquid, some organics adsorbed on the carbon were desorbed back into solution in order to maintain equilibrium conditions. The rate at which the organics desorbed from the GAC was dependent on the overall absorptive capacity of the GAC and on the rate at which they were metabolized in the bulk liquid by the microorganisms.

The reactor was seeded with *Pseudomonas putida*-MT2 strain, a bacteria known to degrade BTEX under aerobic conditions. A small portion of activated sludge from a local municipal wastewater treatment plant w as also added to increase the diversity of the bacterial population and possibly provide additional treatment of the wastewater.

Pure oxygen was supplied to the system by diffusion through pressurized (5 psig) silicone rubber tubing which nearly extended the full depth of the reactor. The dissolved oxygen concentration in the bulk liquid was maintained between 0.8 to 1.6 mg/L. During React, maximum contact between the organics in solution and the bacteria was accomplished by using an internal recycle system as depicted in FIG. 4.

ANALYTICAL METHODS

Chemical Oxygen Demand (COD): Method 508C: Closed Reflux, Colorimetric, *Standard Methods for the Examination of Water and Wastewater*, 16th Edition, 1985.

Total Organic Carbon (TOC): Method 505A: Combustion Infrared Method; *Standard Methods*, with an Ionics Model 1270 TOC analyzer.

Individual BTEX's: USEPA Method 5030 (Purge and Trap) followed by Method 820 (GC) for volatile non-halogenated aromatics as described in: *Test Methods for Evaluating Solid Waste, Vol.* 1B: *Lab*

*Manual, Physical/Chemical Methods;* USEPA SW-846, 3rd edition, November 1986.

GAC Extraction Procedure: OSHA Method #12: Benzene Analysis for Air and bulk samples, in: *Organic Methods,* OSHA Analytical Laboratory Salt Lake City, Utah, 1980.

Dissolved Oxygen: Was measured in the reactor using a YSI Model 5300 Biological Oxygen Monitor.

WASTEWATER CHARACTERISTICS

The wastewater used in this study was acquired from a BTEX contaminated aquifer. Because most of the original BTEX in the sample had been lost during shipping and storage, the wastewater was spiked in the laboratory with additional amounts of BTEX to bring their concentration up to the levels detected at the well site. Additionally, the wastewater was found to be low in essential macro-nutrients, such as phosphorus and nitrogen. These, along with other necessary micro-nutrients that are listed below were added to the wastewater prior to treatment.

| Compound | Concentration mg/L |
|---|---|
| $K_2HPO_4$ | 1,250 |
| $Na_2HPO_4$ | 1,730 |
| $(NH_4)_2SO_4$ | 185 |
| $MgSO_4.7H_2O$ | 74 |
| $CaCl_2.2H_2O$ | 4 |
| $(NH_4)_6Mo_7O_{24}.4H_2O$ | 0.04 |
| $FeSO_4.7H_2O$ | 2 |
| $ZnSO_4.7H_2O$ | 2 |
| $MnSO_4.H_2O$ | 0.4 |
| $CuSO_4.H_2O$ | 0.04 |
| $CoCl_2.6H_2O$ | 0.06 |
| $Na_2B_4O_4.10H_2O$ | 0.04 |
| EDTA | 1.0 |

The feed and reactor pH were maintained between 6.8-7.0 by the addition of a 15 mM phosphate buffer.

The average organic composition of the wastewater is listed below.

| Compound | Concentration mg/L |
|---|---|
| Benzene (B) | 33.8 |
| Toluene (T) | 43.8 |
| Ethyl-Benzene (E) | 9.1 |
| p-Xylene (p-X) | 8.8 |
| m-Xylene (m-X) | 9.0 |
| o-Xylene (o-X) | 12.8 |
| Total Chemical Oxygen Demand (COD) | 397 |
| Total Organic Carbon | 116 |

The daily reactor fill volume and chemical characteristics of wastewater supplied to the reactor are listed below. The fill volume for each cycle was 600 mL.

| Date (1989) | Total Fill per day mL | COD mg/L | TOC mg/L | B mg/L | T mg/L | E mg/L | p-X mg/L | m-X mg/L | o-X mg/L |
|---|---|---|---|---|---|---|---|---|---|
| 09/18 | 600 | 433 | 126 | 26.10 | 46.60 | 12.93 | 11.95 | 12.68 | 18.20 |
| 09/19 | 600 | 302 | 88 | 21.37 | 33.26 | 7.41 | 6.71 | 7.17 | 10.83 |
| 09/20 | 600 | 319 | 93 | 16.20 | 37.84 | 9.00 | 8.03 | 8.60 | 12.30 |
| 09/21 | 600 | 499 | 146 | 42.51 | 44.36 | 15.19 | 13.89 | 14.61 | 19.30 |
| 09/22 | 600 | 357 | 104 | 24.51 | 37.71 | 9.93 | 9.04 | 9.60 | 13.38 |
| 09/23 | 600 | 300 | 88 | 20.82 | 30.08 | 8.36 | 7.68 | 8.13 | 11.12 |
| 09/24 | 600 | 300 | 88 | 20.82 | 30.08 | 8.36 | 7.68 | 8.13 | 11.12 |
| 09/25 | 600 | 342 | 100 | 22.70 | 43.49 | 7.99 | 6.84 | 7.97 | 10.67 |
| 09/26 | 1200 | 353 | 103 | 14.77 | 47.35 | 10.12 | 8.42 | 9.73 | 12.51 |
| 09/27 | 2400 | 459 | 134 | 41.34 | 48.41 | 10.28 | 10.96 | 10.67 | 15.83 |
| 09/28 | 2400 | 422 | 123 | 37.25 | 52.84 | 6.33 | 8.00 | 8.20 | 12.66 |
| 09/29 | 2400 | 442 | 129 | 38.38 | 53.69 | 9.97 | 8.13 | 8.97 | 12.68 |
| 09/30 | 1200 | 443 | 129 | 38.38 | 53.69 | 9.97 | 8.13 | 8.97 | 12.68 |
| 10/01 | 1200 | 372 | 109 | 40.79 | 44.49 | 3.38 | 5.97 | 5.67 | 9.20 |
| 10/02 | 2400 | 400 | 117 | 39.10 | 41.48 | 7.89 | 8.71 | 8.56 | 12.47 |
| 10/03 | 2400 | 342 | 100 | 36.45 | 35.60 | 6.42 | 6.17 | 5.88 | 9.31 |
| 10/04 | 2400 | 382 | 112 | 37.86 | 44.45 | 7.24 | 6.85 | 6.54 | 9.80 |
| 10/05 | 2400 | 448 | 131 | 42.76 | 45.15 | 11.02 | 10.69 | 10.20 | 13.77 |
| 10/06 | 2400 | 453 | 133 | 43.15 | 49.77 | 10.29 | 9.88 | 9.39 | 12.96 |
| 10/07 | 1200 | 453 | 133 | 43.15 | 49.77 | 10.29 | 9.88 | 9.39 | 12.96 |
| 10/08 | 1200 | 429 | 126 | 39.60 | 41.97 | 10.32 | 10.66 | 10.32 | 14.73 |
| 10/09 | 2400 | 440 | 129 | 44.47 | 47.74 | 8.77 | 9.02 | 8.88 | 12.34 |
| 10/10 | 2400 | 440 | 129 | 44.47 | 47.74 | 8.77 | 9.02 | 8.88 | 12.34 |

EFFLUENT CHARACTERISTICS

During the period of operation, Sep. 18 thru Oct. 11, 1989, effluent COD and individual BTEX compounds were monitored daily. The average effluent characteristics at hydraulic residence times (HRT) of 10–40 hours were as follows:

| Compound | Concentration µg/L (range) | % Removal |
|---|---|---|
| Benzene | 18 (<0.2-61) | >99.9 |
| Toluene | 11 (<0.2-35) | >99.9 |
| Ethyl-Benzene | 3.8 (<0.2-22) | >99.9 |
| p-Xylene | 3.7 (<0.2-25) | >99.9 |
| m-Xylene | 3.1 (<0.2-26) | >99.9 |
| o-Xylene | 3.8 (<0.2-28) | >99.9 |
| COD | <24,000 | >94 |
| TOC | <5,700 | >95 |

Little variation in effluent quality was noted over entire range of HRT's tested. Daily average effluent BTEX, COD and TOC concentrations are shown below.

| | | | Daily Effluent Characteristics | | | | | |
|---|---|---|---|---|---|---|---|---|
| Date | COD mg/L | TOC mg/L | B μg/L | T μg/L | E μg/L | p-X μg/L | m-X μ/L | o-X μg/L |
| 09/20/89 | — | — | 14.9 | 23.8 | 13.3 | 17.4 | 17.0 | 18.6 |
| 09/21/89 | — | — | 26.7 | 34.0 | 14.0 | 14.1 | 11.4 | 9.1 |
| 09/22/89 | — | — | 14.0 | 19.7 | 6.0 | 7.0 | 7.0 | 6.7 |
| 09/25/89 | 31 | 11 | 6.8 | 6.7 | ND* | ND | ND | ND |
| 09/26/89 | 23 | 4 | ND | 8.3 | ND | ND | 3.3 | ND |
| 09/27/89 | <25 | 5 | 4.0 | 2.0 | 1.2 | 1.3 | 1.3 | 1.9 |
| 09/28/89 | <25 | 3 | 0.2 | ND | 0.2 | 0.7 | 0.4 | 0.5 |
| 09/29/89 | <25 | 4 | ND | ND | ND | ND | ND | ND |
| 10/02/89 | 23 | 4 | ND | ND | ND | ND | ND | ND |
| 10/03/89 | 23 | 4 | 40.0 | 13.0 | 2.5 | 1.9 | 0.7 | 2.5 |
| 10/04/89 | 21 | 4 | 30.0 | 12.0 | 1.5 | 1.3 | 0.6 | 1.6 |
| 10/05/89 | 29 | 5 | 57.5 | 22.5 | 7.5 | 7.0 | 4.0 | 8.0 |
| 10/06/89 | 28 | 5 | 57.0 | 26.5 | 4.6 | 3.8 | 2.8 | 4.7 |
| 10/07/89 | — | — | 19.0 | 7.0 | 2.0 | 2.0 | 1.0 | 2.0 |
| 10/08/89 | 28 | 8 | 28.1 | 10.2 | 3.0 | 2.0 | 2.0 | 3.0 |
| 10/09/89 | 26 | 11 | 3.0 | 2.0 | 7.0 | 1.2 | 0.3 | 1.4 |
| 10/11/89 | 16 | 6 | 1.0 | 1.0 | 0.2 | 2.0 | ND | 3.0 |

*ND = not detected with method detection limit of 0.2 μg/L for each compound.

VOLATILIZATION

As previously mentioned, volatilization was minimized by the use of the silicone rubber tubing oxygen supply system. The total mass of BTEX lost due to volatilization was very small, approximately 1 mg total over 23 days and 58 operating cycles. This was less than 0.05% of the total mass of BTEX applied to the system over the same period.

ADSORPTION AND BIODEGRADATION

At the end of the 23 day testing period, portions of the reactor GAC were extracted with carbon disulfide (OSHA method #12, 1980) and analyzed for BTEX. Based on these measurements it was estimated that 55% of the total mass of BTEX added was present on the activated carbon. The removal of BTEX by biodegradation was estimated to be approximately 45% of the total mass added during the period.

OXYGEN UPTAKE RATES

Measured oxygen uptake rates in the reactor ranged from 13-28 mg/L (of reactor volume) per hour. These relatively aggressive rates confirm the biological degradation of 45% of the BTEX added during the study period.

Although our invention has been described using the above example and certain preferred embodiments thereof, we do not intend that our invention be limited in scope except as expressly defined in the appended claims.

What we claim is:

1. A process for removing organic contaminants from a contaminant-laden source, said process comprising the steps of:
    a) collecting said contaminant-laden source in a storage tank;
    b) pretreating said source while in said tank to remove suspended solids, normalize variations in contaminant concentration, and stabilize flow rate wherein the flow rate may be varied;
    c) flowing said source through a granular activated carbon filter to adsorb said organic contaminants;
    d) providing a dense, adhesive biofilm on a surface of a gas permeable membrane downstream of said filter;
    e) flowing said source across said gas permeable membrane; and
    f) providing a reactor containing specialized microbes to house said gas permeable membrane, wherein said contaminants are destroyed as they flow through said reactor.

2. The process of claim 1 wherein step a) includes providing said storage tank with liquid level indicators to control source flow rate into and out of the tank.

3. The process of claim 1 wherein said source includes a volatile organic contaminants obtained from spent granular activated carbon and step c) includes supplying clean water recirculated from said reactor into said carbon filter and desorbing biodegradable contaminants off the granular activated carbon.

4. Apparatus for removing organic contaminants from a contaminant-laden source and destroying the contaminants said apparatus comprising a storage tank having an inlet and an outlet, said inlet in flow communication with said contaminant-laden source, an adsorption tank in flow communication with said storage tank outlet, said adsorption tank including means for adsorbing VOC's out of said source a sequencing batch biofilm reactor in flow communication with an outlet of said adsorption tank, means for introducing microbes into said biofilm reactor to destroy said organic contaminants, said biofilm reactor including an internal gas permeable membrane on which said microbes are located wherein said contaminants are destroyed as they are contacted by said microbes, and pump means for flowing said contaminant lade source from said storage tank through said biofilm reactor.

5. Apparatus of claim 4 wherein said adsorption tank contains a quantity of granular activated carbon.

6. Apparatus of claim 4 wherein said storage tank includes multiple liquid level indicators in communication with a microprocessor, said microprocessor in electrical communication with said pump means wherein flow of said contaminant-laden source through the apparatus is controlled.

7. Apparatus of claim 6 wherein said storage tank, adsorption chamber and biofilm reactor are connected by a continuous circuit through which said contaminant-laden source is flowed under influence of said pump means, valve means positioned along said conduit for regulating flow of said source, said valve means in communication with said microprocessor.

8. Apparatus of claim 6 wherein said biofilm reactor includes a first liquid outlet conduit means for decanting effluent liquid after contact with said gas permeable membrane.

9. Apparatus of claim 8 wherein said biofilm reactor includes a second liquid outlet conduit means in flow communication with said first liquid outlet conduit, means carried by said second outlet conduit means for testing fluid drained from said biofilm reactor to determine contaminants content of the fluid.

10. Apparatus of claim 4 wherein said gas permeable membrane is arranged in a continuous network within said biofilm reactor, and means for introducing a gaseous carrier into said network, said gaseous carrier including an electron donor or acceptor.

11. Apparatus of claim 10 wherein said biofilm reactor includes an exhaust outlet to vent said gaseous carrier out of the apparatus.

12. Apparatus of claim 4 wherein said contaminant-laden source is contaminated water.

* * * * *